United States Patent Office 3,041,129
Patented June 26, 1962

3,041,129
AMINOANTHRAQUINONYL MONOAZO DYESTUFFS
Alfred Staub, Binningen, near Basel, Switzerland, assignor to J. R. Geigy A.-G., Basel, Switzerland
No Drawing. Filed Dec. 9, 1960, Ser. No. 74,782
Claims priority, application Switzerland Dec. 11, 1959
4 Claims. (Cl. 8—26)

The present invention concerns new, valuable, direct drawing, green dyestuff mixtures which are suitable for the dyeing of cellulose material, and a process for the production thereof.

It has been found that valuable green cellulose dyestuffs are obtained by reacting, in any order desired, about equimolecular amounts of 4-(4-amino-3-sulphoanthraquinonyl - 1 - amino)-4'-aminodiphenyl-3'-sulphonic acid and a 4'-amino-4-hydroxyazobenzene- 3-carboxylic acid which in the benzene nucleus not containing amino groups can be further substituted by chlorine or $CH_3$, or the soluble salts thereof, with 2,4,6-trichloro-1,3,5-triazine to form a secondary condensation product of the general Formula I Yellow aminoazo dyestuffs usable according to the invention correspond to the general Formula II

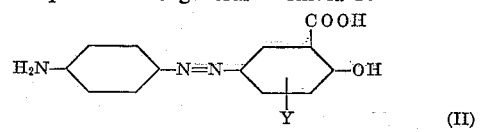

In this formula Y represents hydrogen, chlorine or the methyl group.

The following can be used, for example, according to the invention: 4-amino-4'-hydroxy-1,1'azobenzene-3'-carboxylic acid, 4-amino-5'- or -6'-methyl-4'-hydroxy-1,1'-azobenzene-3'-carboxylic acid or 4-amino-6'-chloro-4'-hydroxy-1,1'-azobenzene-3'-carboxylic acid.

To produce dyestuffs according to the invention, finely distributed cyanuric chloride is reacted in the first step with, for example, the equimolecular amount of 4-(4-amino - 3 - sulphoanthraquinonyl - 1-amino)-4'-aminodiphenyl-3'-sulphonic acid in the form of the aqueous solution of one of its salts and, in the second step, it is reacted with the equimolecular amount of an aminoazo dyestuff of the general Formula II, also in the form of the aqueous solution of one of its salts. The first step

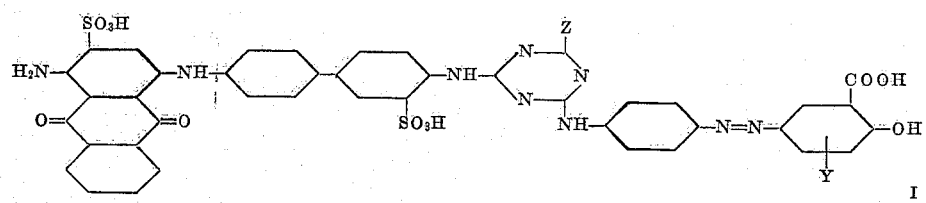

I wherein Z represents chlorine and Y represents hydrogen, chlorine or the methyl group, and partially replacing Z in the secondary condensation product by the phenylamino group by reacting with phenylamine, possibly in the presence of acid binding agents.

In the preferred methods of performing the process, 4'-amino-4-hydroxyazobenzene-3-carboxylic acid is used as yellow component. Particularly valuable compositions which are distinguished by an improved drawing power onto cellulose fibres and similar affinity to cellulose fibres of various origin are obtained if mixtures of dyestuffs according to the invention of the general Formula I are formed or produced wherein on the average Z is about 30 to 70% phenylamino and, on the average, about 70 to 30% Cl.

To produce the blue anthraquinone component, 1-amino-4-bromoanthraquinone-2-sulphonic acid is reacted with 4,4'-diaminodiphenyl-3-sulphonic acid, for example in aqueous solution of the alkali metal salts at temperatures of about 70–90° with the addititon of sodium carbonate or sodium bicarbonate as acid binding agent and in the presence of the usual copper catalysts.

reaction is performed advantageously at 0–5° C. and the second at about 40–50° C. The acid reaction occurring during the reaction is advantageously continuously neutralised, for example with dilute solutions of sodium or potassium hydroxide or also with aqueous sodium carbonate or bicarbonate solution and the reaction is so neutralised that the pH of the solution is always 6–7. If desired, also buffer salt solutions can be used to buffer the acid reaction. The reverse order can also be used by reacting the cyanuric halide in the first step with the aminoazo dyestuff and in the second step with the anthraquinone component, but the order first described above is preferred.

The third halogen atom of the cyanuric halide is reacted in the last step with aniline, advantageously at a higher temperature. Alkali hydroxides, alkali carbonate or tertiary nitrogen bases are used as acid binding agents and, in order to avoid the undesired hydrolysis of the chlorine, the pH of the solution is never allowed to considerably exceed 7 or never exceed 8.

A particularly good dyestuff mixture according to the invention corresponds to a mixture consisting of 30 to 70% by weight of a dyestuff of the general formula

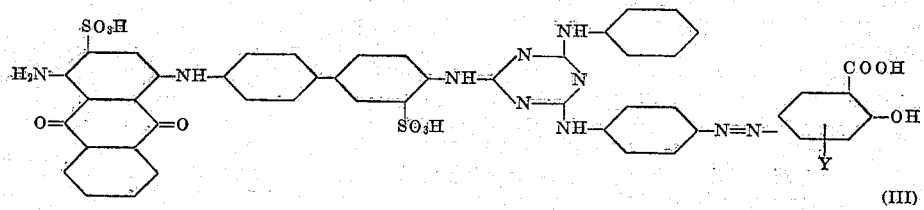

(III)

and 70 to 30% by weight of a dyestuff of the general formula

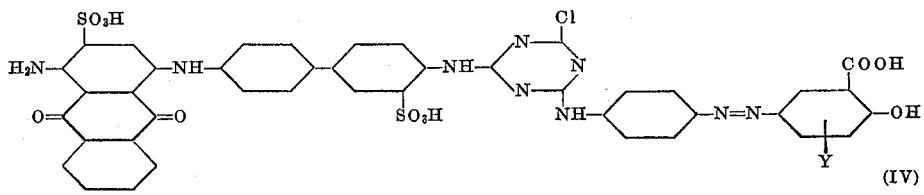

wherein in the above formulae, Y is selected from the group consisting of hydrogen, chlorine and methyl.

Dyestuff mixtures of the above type wherein in the above formulae, Y is H as well as dyestuff mixtures of the above formulae wherein Y is H and with a corresponding 50 to 70% by weight of the phenylamino component and 50 to 30% by weight of the chloro component are particularly advantageous.

The mixtures according to the invention can be produced both by only partial replacement of the halogen by phenylamino as well as by mechanically mixing the chlorotriazinyl dyestuff with the phenylaminotriazinyl dyestuff in the desired ratio.

It is astounding that such a strongly increased drawing power is obtained with the mixtures of the completely amidated triazine dyestuffs according to the invention, which in themselves do not draw particularly well onto cellulose fibres, and their badly drawing, chlorine-containing intermediate products.

It is also a remarkable fact that the dyestuffs according to the invention have very good fastness to acetate silk, i.e. they reserve acetate silk. Also, side products of the manufacture of the dyestuffs—which in certain circumstances can unfavourably influence the acetate silk reserve—can easily be removed.

The following examples illustrate the invention. Parts are given therein as parts by weight and the temperatures are in degree centigrade. The relationship or parts by weight to parts by volume is as that of kilogrammes to litres.

*Example 1*

18.5 parts of cyanuric chloride are dissolved in 100 parts of acetone and brought into finely distributed form by pouring the solution into 500 parts of water and 400 parts of ice.

A solution of the sodium salt of 25.7 parts of 4-amino-4'-hydroxy-1,1'-azobenzene-3'-carboxylic acid in 1000 parts of water is added at 0–5°. The acid reaction occurring during the reaction is continuously buffered by the dropwise addition of 1 N-caustic soda lye and the pH is kept as constant at 5–6 as possible. The reaction product is a fine yellow suspension.

This suspension is heated to 40–45°, the solution of the sodium salt of 56.5 parts of 4-(4-amino-3-sulphoanthraquinonylamino-1)-4-'-aminodiphenyl-3'-sulphonic acid in 1000 parts of water is added and again the acid reaction occurring is neutralised by the slow addition of 1 N-caustic soda lye so that the pH of the solution is 6–6.8.

On completion of the second condensation, 25 parts of aniline are added and the whole is boiled until no more organically bound chlorine can be traced in the dyestuff, the pH being adjusted to 6.8 to 7.8 by the addition of 1 N-caustic soda lye.

The solution is allowed to cool to 60°, made strongly alkaline by the addition of 150 parts of concentrated caustic soda lye and the dyestuff is salted out with 150 parts of sodium chloride. The dyestuff is filtered off and washed with 5% sodium chloride solution until the used washing water is neutral.

The dried dyestuff is a dark powder which dissolves in water with a green colour.

*Example 2*

18.5 parts of cyanuric chloride are dissolved in 100 parts of acetone. The solution is poured into 500 parts of ice and 400 parts of water whereupon a fine dispersion is obtained.

The solution of the sodium salt of 56.5 parts of 4-(4-amino-3-sulphoanthraquinonyl-1-amino)-4'-aminodiphenyl-3'-sulphonic acid in 4000 parts of water is added within 1 hour and the pH is kept at about 6 by the gradual dropwise addition of 100 parts of N-caustic soda lye (or of 60 parts of a 2 N-sodium carbonate solution). A gelatinous solution is formed which is stirred for another hour.

This solution is then heated to 40–45° and the solution of the sodium salt of 25.7 parts of 4-amino-4'-hydroxy-1,1'-azobenzene-3'-carboxylic acid in 500 parts of water is added. The pH of the solution is kept at 6–6.8 by the dropwise addition of N-caustic soda lye. This second reaction is finished after about 2 hours.

6 parts of aniline are then added to the solution which is then heated for 24 hours, the pH being kept at 6.8–7.0 by the addition of 1 N-caustic soda lye.

The dyestuff formed is precipitated by the addition of 250 parts of sodium chloride and is filtered off. It is washed with 2% sodium chloride solution until the used washing water is colourless.

The dyestuff formed also contains in part the secondary chlorine-containing condensation product. It dyes cellulose in blueish green shades and is distinguished by particularly good drawing power onto cellulose fibres.

If in the above process instead of 6 parts of aniline, 3, 5 or 7 parts of aniline are used then dyestuffs mixtures having similar properties are obtained.

If instead of 25.7 parts of 4-amino-4'-hydroxy-1,1'-azobenzene-3'-carboxylic acid as yellow component for the condensation, 27.1 parts of 4-amino-4'-hydroxy-5'- or -6'-methyl-1,1'-azobenzene-3'-carboxylic acid or 29.1 parts of 4-amino-4'-hydroxy-6'-chloro-1,1'-azobenzene-3'-carboxylic acid are used, then dyestuffs are obtained which dye cotton in similar green shades.

*Example 3*

The procedure is as described in Example 2, but the secondary chlorine-containing condensation product is isolated by salting out after the second step of the reaction.

Instead of salting it out, the secondary condensation product can also be obtained by precipitating with ethanol and filtering off the precipitated product.

The secondary condensation product dyes cotton in blueish green shades. However, per se it has a slight drawing power onto cellulose fibres.

If the secondary condensation product is mixed with the tertiary condensation product obtained according to Example 1 in the ratio of about 2:1 to 1:2, then dyestuff mixtures which have increased drawing power onto cellulose fibres are obtained.

*Example 4*

1.5 parts of the green dyestuff mixture obtained according to Example 2 are dissolved in 75 parts of hot water. This solution is diluted with 45° warm water to form a dye liquor of 4000 parts. 100 parts of cotton fibres are introduced, the bath is brought to the boil within 15 minutes and dyeing is performed for 45 minutes in a boiling bath with the gradual addition of 40 parts of Glauber's salt.

A fast, pure, green dyeing is obtained which, in particular, has good fastness to water.

What I claim is:

1. A dyestuff mixture consisting of 30 to 70% by weight of a dyestuff of the general formula

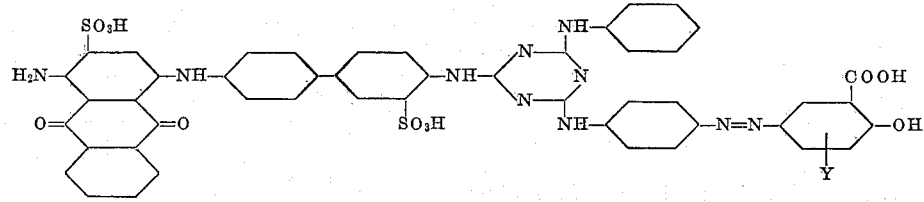

and 70 to 30% by weight of a dyestuff of the general formula

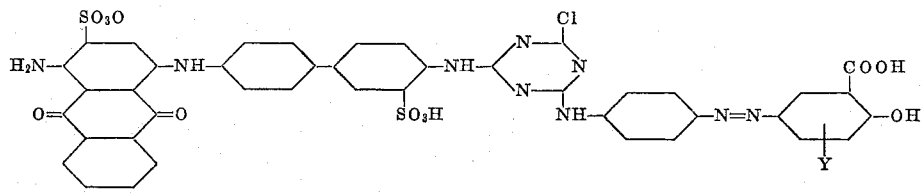

wherein in the above formulae, Y is selected from the group consisting of hydrogen, chlorine and methyl.

2. A dyestuff mixture consisting of 30 to 70% by weight of a dyestuff of the formula

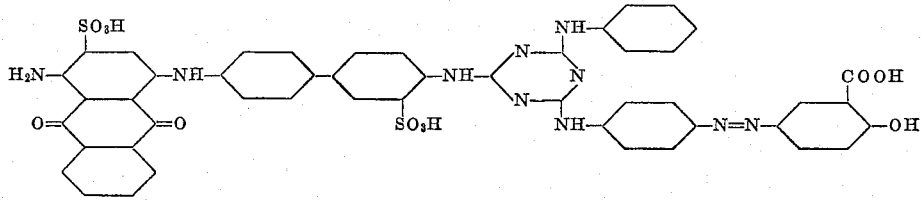

and 70 to 30% by weight of a dyestuff of the formula

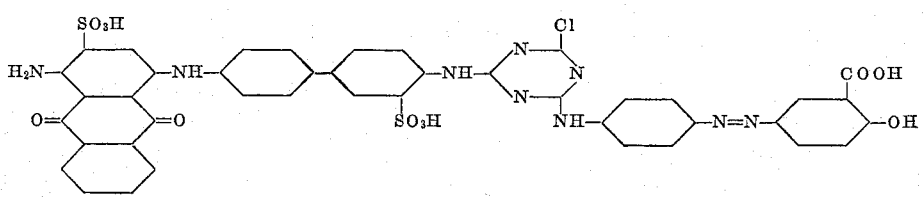

3. A dyestuff mixture consisting of 50 to 70% by weight of a dyestuff of the formula

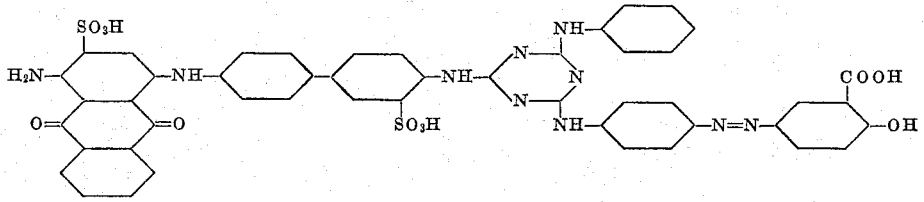

and 50 to 30% by weight of a dyestuff of the formula

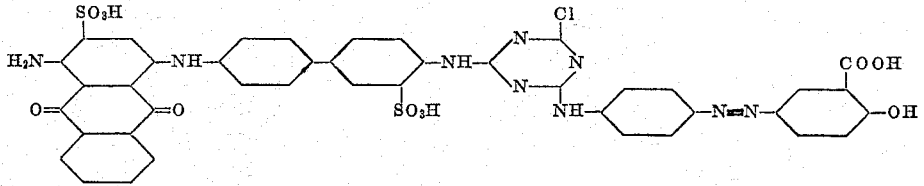

4. A dyestuff mixture consisting of 60% by weight of a dyestuff of the formula
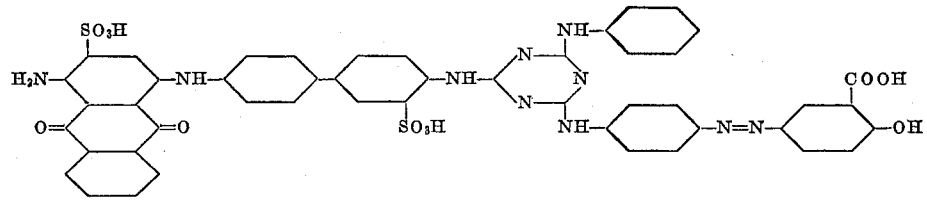
and 40% by weight of a dyestuff of the formula
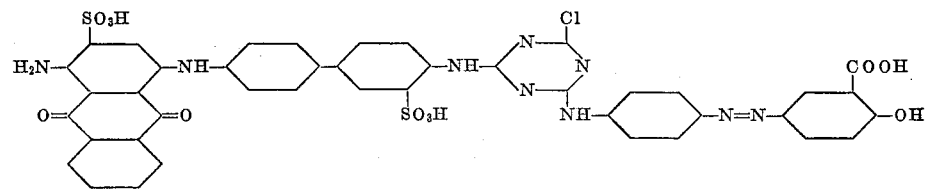
References Cited in the file of this patent
UNITED STATES PATENTS
| | | |
|---|---|---|
| 1,958,327 | Winkler | May 8, 1934 |
| 2,696,486 | Gunst | Dec. 7, 1954 |
| 2,853,482 | Gunst | Sept. 23, 1958 |
| 2,953,560 | Baker | Sept. 20, 1960 |
| 2,963,473 | Benz | Dec. 6, 1960 |